Dec. 11, 1951        J. ROSAN        2,577,810
SCREW-THREADED INSERT
Filed Nov. 8, 1946        3 Sheets—Sheet 3
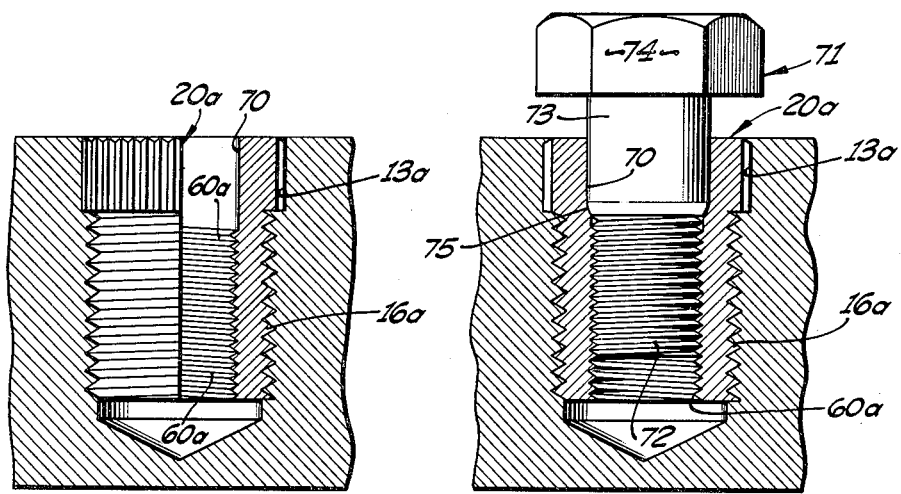
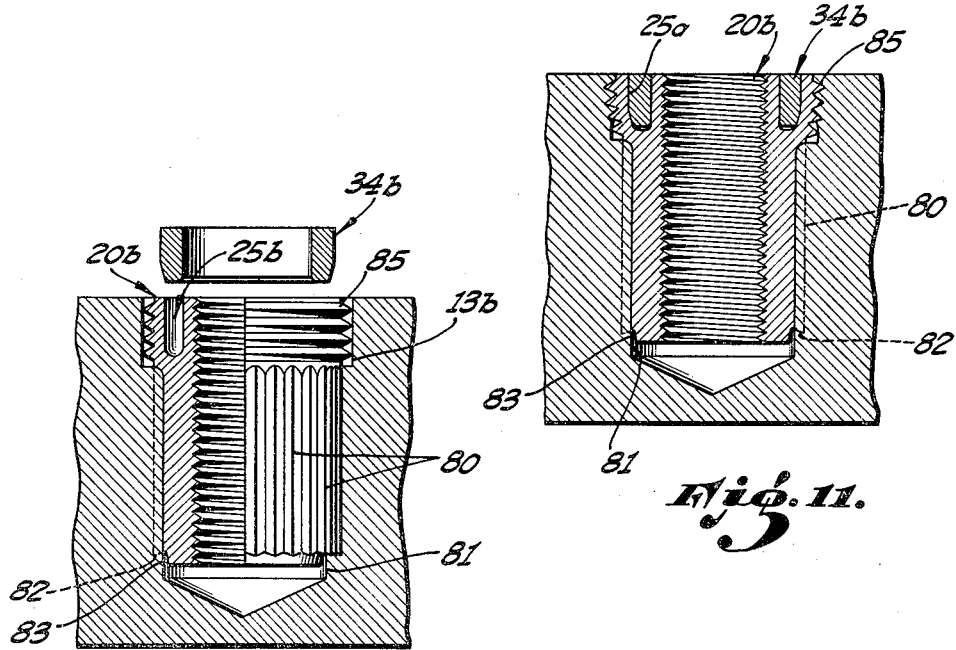
JOSEPH ROSAN,
INVENTOR
ATTORNEY.

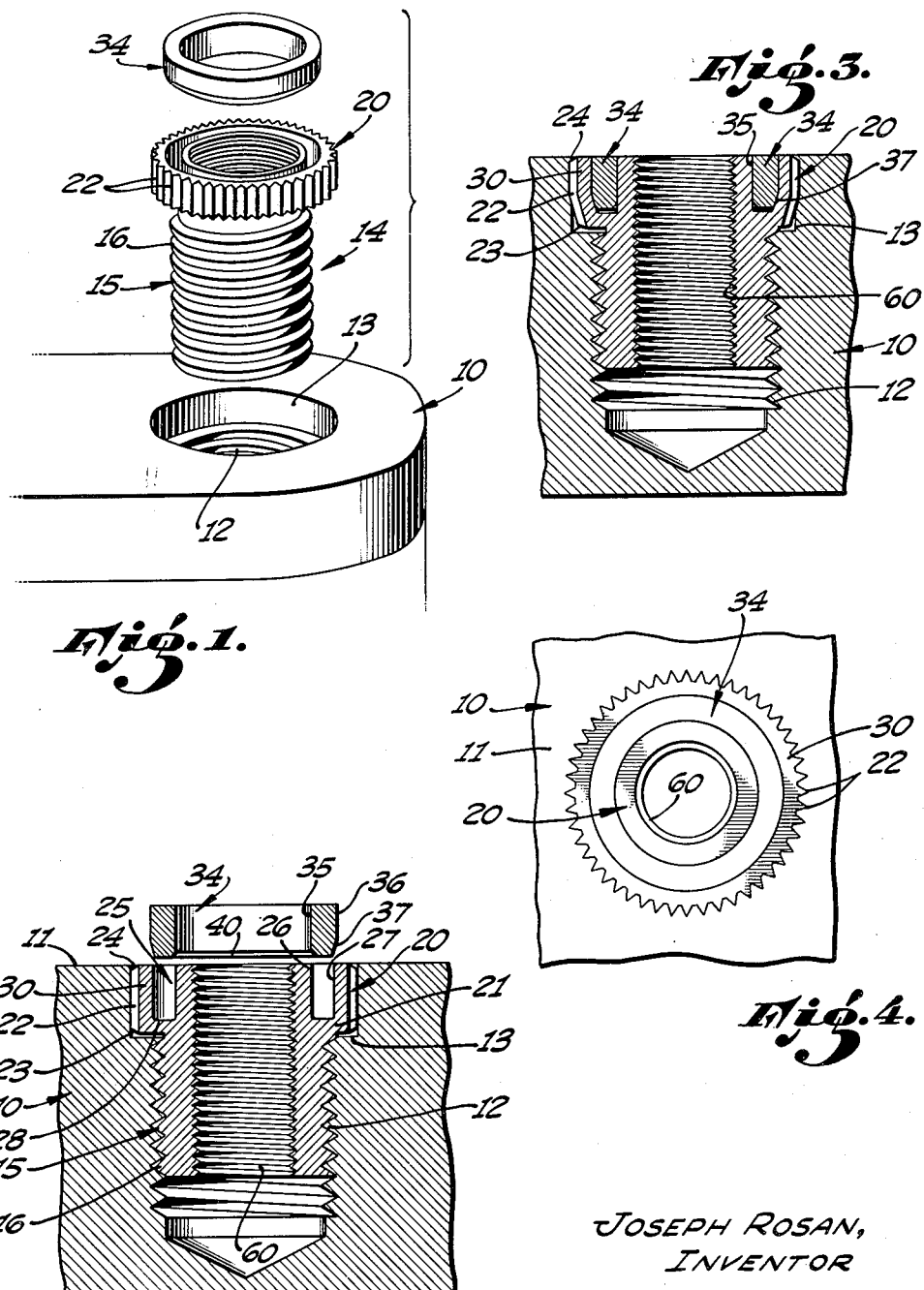

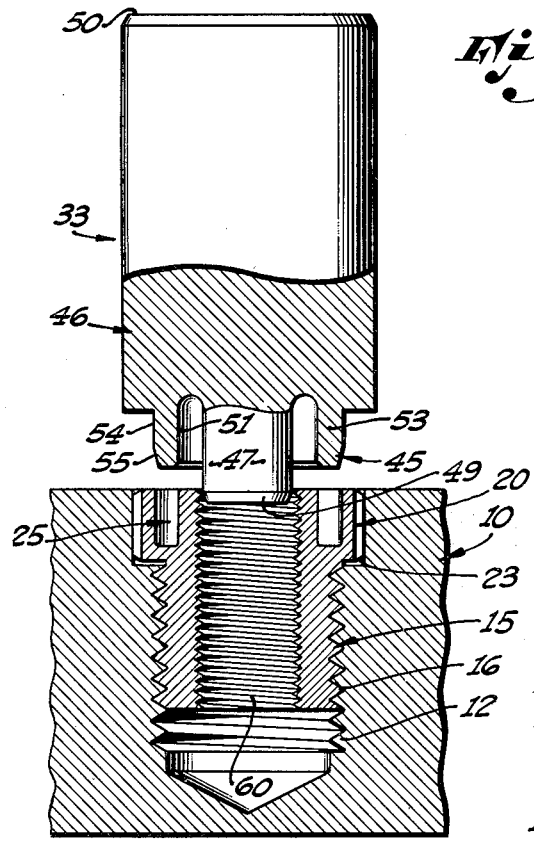
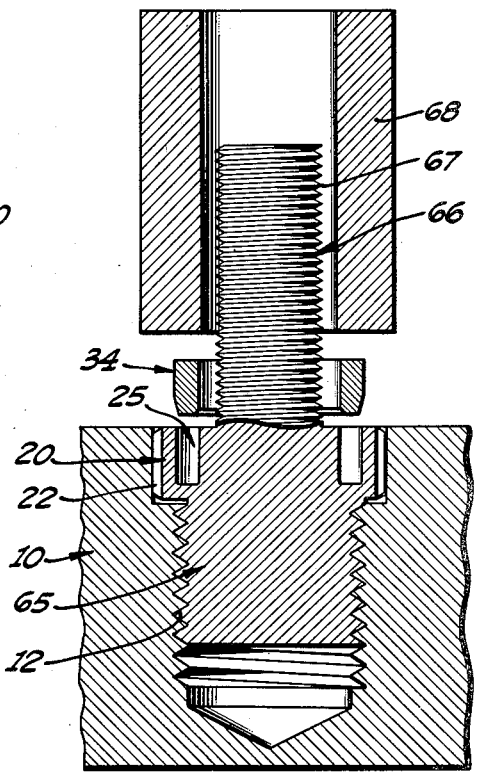
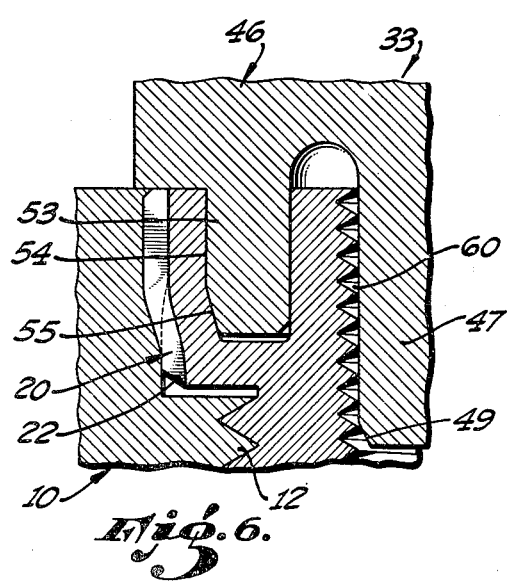

Patented Dec. 11, 1951

2,577,810

UNITED STATES PATENT OFFICE 2,577,810

SCREW-THREADED INSERT

Joseph Rosan, Balboa Island, Calif.

Application November 8, 1946, Serial No. 708,725

12 Claims. (Cl. 151—33)

The present invention relates generally to inserts designed to provide anchorage for screw-threaded connecting members such as studs or bolts in bodies of relatively soft materials or in materials that are otherwise physically unsuited for the purpose.

The recent trend in modern construction has greatly accelerated the use of relatively soft materials and is probably most fully realized in the aircraft industry where the several relatively soft aluminum and magnesium alloys, as well as various plastics and woods, are extensively used. The problem of providing secure connections or anchorages to such bodies presents a number of difficulties, and is particularly acute in the case of aircraft construction, where the fastening is subject to constant vibration, yet positive assurance must be had that the insert will not loosen and fail either by longitudinal displacement or by rotation.

Inserts for such purposes as herein indicated have been provided in the past and are well known in the art, but have generally been unsatisfactory for one reason or another, such as insecurity, complexity, cost of manufacture, difficulty of insertion, or time consumed in insertion. Accordingly, the present invention has as its primary object the provision of a new and improved insert capable of forming a permanent anchorage of maximum security in a parent body of relatively soft material, and which is, at the same time of extremely simple and inexpensive construction.

A further object of the invention is to provide an insert which can be installed quickly and easily with simple hand tools.

Another object of the invention is to provide an insert having a minimum of critical dimensions which must be held to close tolerances, so that the production costs of the insert are correspondingly reduced.

Still another object of the invention is the provision of a one piece insert having the security and other advantageous feature of prior two piece inserts, with the additional advantages inherent in a one piece construction. By thus eliminating one element with its several precise machining operations, I have provided an insert characterized by the utmost simplicity and capable of being produced at a minimum cost.

A further object of the invention is the provision of an insert having an expandable locking collar capable of being installed either with an expanding tool which is removed upon completion of installation, or alternatively, by a locking ring which remains permanently fixed within the insert, affording a smooth flush surface on the end of the insert and at the same time providing additional reinforcement for the locking collar of the insert.

Another object is the provision of a special insert embodying a stud.

Still a further object is the provision of a novel means and method of installing the insert into the parent material.

The above objects are attained in the present invention in one of its embodiments by the provision of an externally threaded cylindrical insert body which is adapted to be screwed into a tapped bore in the parent body of relatively soft material. The outer end of the insert body is formed with an annular locking head or collar projecting radially outward beyond the crests of the external screwthreads, and this locking head is provided on its peripheral surface with a plurality of longitudinally extending serrations or splines which lie generally parallel to the axis of the insert body, and has a deep annular groove formed in its outer end surface, which is adapted to receive an expanding ring or tool. The tapped hole into which the insert is to be installed is counterbored to a depth slightly greater than the height of the locking head, and to a diameter only slightly larger than the diameter of the locking head measured across the crests of the serrations, so that when the insert body has been screwed into the bore prepared for it, the counterbore is substantially filled by the locking head. An expanding tool or filler ring is then inserted into the annular groove in the end of the locking head, and the outer rim of said head is expanded radially outward, causing the serrations to press into and become firmly embedded in the side walls of the counterbore. These serrations embedded in the parent body provide a positive locking engagement, preventing the insert from rotating or coming loose. In the majority of cases, for reasons of economy, it is probable that the insert would be installed with a special expanding tool provided for that purpose, leaving the annular groove open, although where desirable or necessary in critically stressed installations, the groove can be filled with a filler ring either after expansion or by using the ring itself as an expanding tool.

In another embodiment of the invention, the annular channel in the end of the locking head is omitted and the entire locking head is expanded radially outward by an installing tool to embed the serrations in the parent body.

Still another form of the invention utilizes longitudinally extending serrations or splines on the body of the insert which broach their way into the sidewalls of a smooth bore in the parent body to lock the insert against turning. In this instance, the insert is locked against longitudinal movement with respect to the parent body by means of circumferentially extending serrations or threads on the locking head which are embedded in the sides of a counterbore in the parent body when the locking head was expanded radially outward.

The foregoing and other objects and advantages of the present invention will become apparent to those skilled in the art upon consideration of the following detailed description of certain selected illustrative embodiments thereof, reference for this purpose being had to the accompanying drawings, in which:

Figure 1 is an enlarged exploded view, in perspective, showing a tubular insert body, the expanding filler ring therefor, and the bore in the parent body into which the insert is to be installed;

Figure 2 is a longitudinal medial section through an insert which has been screwed into the bore prepared for it, showing the filler ring positioned for insertion into the annular groove;

Figure 3 is a similar view of the insert after the filler ring has been driven into the groove, with the outer rim of the locking head expanded and the serrations embedded in the side walls of the counterbore;

Figure 4 is a top plan view of the installed insert and filler ring;

Figure 5 is a sectioned view of an insert, with the expanding tool positioned for insertion into the groove;

Figure 6 is an enlarged fragmentary longitudinal section showing the manner in which the locking ring is expanded by the tool;

Figure 7 is a sectional view showing a modified insert body formed with an integral stud, the filler ring therefor, and a typical tool for driving the ring into the annular groove;

Figure 8 is a partially sectioned view of another form of the invention, showing the insert installed in the parent body but before expansion of the locking head;

Figure 9 is a similar view of the same, showing the locking head expanded, and one form of tool for expanding the head;

Figure 10 is a partially sectioned view of still another embodiment of the invention wherein the insert is provided with longitudinally extending serrations or splines which broach their way into the sides of a smooth bore in the parent body to lock the insert against turning, while the locking head is provided with circumferentially extending serrations or threads which are expanded into the sides of a counterbore in the parent body to lock the insert against longitudinal displacement; and Figure 11 is another view of the same after the locking head has been expanded by the locking ring.

Reference is had first to Figures 1 to 6 of the drawings, wherein the numeral 10 designates generally a body, hereinafter referred to as the "parent body," of relatively soft material such as aluminum or magnesium alloy, plastic, or the like, having an outer surface 11. By the term "relatively soft material" it will be understood of course that I refer to a material softer than the insert body, the latter being preferably formed of mild or heat treated steel, brass, bronze, or the like. Formed in the parent body 10 is a blind screw-threaded bore 12 extending inwardly from its outer surface 11, and having an enlarged counterbore 13 of a diameter and depth determined by the dimensions of the locking head on the insert, as will be pointed out more fully hereinafter.

The insert itself is designated by the reference numeral 14, and in the typical embodiment illustrated in Figures 1 to 6, inclusive, comprises a generally tubular body 15 having external screw-threads 16 on its outer peripheral surface, and a locking head or collar 20 on the top end thereof. The external screwthreads 16 are adapted for engagement with the screwthreaded bore 12, and are preferably of relatively coarse pitch with a deep thread, providing firm anchorage in the parent body for resisting longitudinal thrust stresses.

The locking head 20 consists of an annular flange 21 extending radially outward, appreciably beyond the crests of the threads 16, said flange preferably having a length or depth equal to about two or three of the threads 16, although this dimension is not critical and may vary widely. The outer periphery of the locking head 21 is formed with external locking formations which are adapted to inter-engage with the parent body to lock the insert against turning, and in the present preferred form of the invention, such locking formations take the form of a plurality of parallel serrations, ribs, or splines 22, disposed parallel to the axis of the tubular insert, and extending entirely around the head. These serrations are preferably of angular configuration, as shown in Figure 4, with the crests thereof either relatively sharp-edged or radiused for easier penetration into the parent body. In highly stressed installations where stress concentrations must be avoided, the use of the radiused crests is, of course, preferable to the sharp-edged crests, although the latter will be found suitable for the majority of applications. The serrations 22 may easily and conveniently be formed on a standard knurling machine or in a die, although the latter process produces a more uniform and accurately formed article and is therefore the preferred one. The bottom edge of the locking head 20 may be chamfered at 23 to facilitate entrance of the locking head into the counterbore 13 if the latter should happen to be slightly undersized in diameter or otherwise interferes with the free entry of the head. The top edge of the locking head is chamfered at 24 to prevent the material of the parent body from raising up around the margin of the counterbore when the locking head is expanded, as will be pointed out hereinafter.

Formed in the top or outer end of the locking head 20 is a cavity, preferably in the form of an axially extending, annular groove 25 having inner and outer sides 26 and 27 extending parallel to the axis of the insert, and a radiused bottom 28. The groove 25 extends into the head 20 to a depth of two-thirds to three-fourths the thickness of the head, leaving a thin rim 30 of material between the outer wall of the groove and the serrated outer periphery of the head.

At this point it might be appropriate to mention that the counterbore 13 is proportioned to receive the locking head 20 in closely fitting relation; the diameter of the counterbore being only a few thousandths of an inch larger than the maximum diameter of the head, measured across the crests of the serrations 22, and the depth of the counterbore being in the neighborhood of ten thousandths of an inch greater than the depth of the head. Thus, the insert can be screwed down into the tapped bore 12 until the locking head 20 is entirely received within the counterbore.

The insert is locked into the parent body to prevent rotation thereof by expanding means which acts to expand the rim 30 of the locking head until the serrations 22 are embedded in the side walls of the counterbore. Such expanding means may take the form either of a tool, such as that designated generally by the reference numeral 33 in Figure 5, or of a ring 34 as shown in Figures 1 to 4, inclusive. Either form of expanding means is equally effective for the purpose of locking the insert in the parent body, although the ring 34 has certain advantages in conditions where high torque loads are experienced due to the fact that it prevents collapse of the outer rim 30. In such cases, the ring is driven into the groove 25 by a mallet or hammer and remains permanently therein as an integral part of the insert. The ring 34 is also used where it is desirable for one reason or another to have a smooth, flush outer surface on the end of the insert.

In its preferred form, the ring 34 is formed with a cylindrical inner surface 35, and an outer peripheral surface comprising an upper cylindrical portion 36 and a lower conical portion, or chamfer 37. The chamfer 37 preferably extends for about one-third the length of the ring, while the cylindrical portion 36 occupies the remainder of the length. Typically, the chamfer has an angle of about 15° to the cylindrical portion 36 which, for a chamfer length of $\frac{1}{32}$ inch, gives a rise of about eight thousandths of an inch from the bottom to the top of the chamfer. The inner diameter of the ring is a few thousandths greater than the diameter of the inner wall 26 of the groove 25, while the outer diameter measured across the bottom edge of the chamfer 37 is slightly less than the diameter of the outer wall 27 of the groove. The bottom portion of the ring is thus slightly narrower than the groove 25 and is preferably additionally provided with a narrow chamfer 40 on its inner edge, so that the ring can be centered in the groove and started into the same.

The depth, or length of the ring measured along the axial direction, is preferably about ten thousandths of an inch less than the depth of the groove 25, leaving a slight amount of clearance between the bottom of the groove and the bottom of the ring when the latter has been driven flush with the top end of the locking head. This clearance eliminates any possibility of the ring "bottoming" or engaging the bottom of the groove before the top surface thereof has become flush with the top of the locking head, and provides a certain amount of leeway to take care of manufacturing tolerances.

The maximum outside diameter of the ring 34, measured across the outer cylindrical portion 36, exceeds the minimum outside diameter taken across the bottom edge of the chamfer 37 by a distance equal to twice the amount of rise of the chamfer, or sixteen thousandths of an inch which, for the example given, is the height of one of the serrations 22. If the amount of rise of the chamfer is made greater than eight thousandths of an inch, the height of the serrations would, of course, be increased proportionately. Thus, when the ring is driven into the groove the rim 30 is expanded outwardly a distance equal to approximately one-half the height of the serrations 22, forcing the latter into the side walls of the counterbore 13. The metal displaced by the crests of the serrations flows into the bottoms of the grooves, and in consequence the serrations are solidly and completely embedded in the side walls of the counterbore. It has also been found that there is a certain amount of plastic flow of the parent material in a vertical direction tending to produce a slight bulging of the surface 11 around the margin of the counterbore 13, but this is eliminated by the provision of the chamfer 24 which is filled by the excess material, leaving a flat, smooth surface. Figure 3 shows an insert with the locking ring 34 driven into place.

The tool 33 functions in the same manner as the ring 34 and, in the illustrative form shown in Figure 5, is nothing more than a die having an annular formation 45 on the bottom end thereof corresponding in all respects to the ring 34, and a pilot 47. It will be understood, however, that any form of swaging or spinning tool capable of producing the desired expansion of the rim 30 might be used, and that the illustrated form is merely by way of example.

In this case, the tool comprises a cylindrical shank or body 46 having a head 50 at the top end thereof which can be struck by a hammer or engaged by the ram of a press. The pilot 47 is preferably in the form of a cylindrical stud projecting downwardly from the bottom end of the body 46 coaxial therewith. The outside diameter of the stud is slightly less than the diameter of the bore measured across from the crest of one thread to the crest of the other, so that the pilot may pass freely down into the threaded hole without interference from the threads. The bottom edge of the pilot 47 is chamfered at 49 to aid in guiding it into the the hole. The formation 45 is in the nature of an axially extending, annular flange 53 concentric with the pilot 47 and spaced radially outward therefrom, leaving an annular groove or channel 51 between them. The inside diameter of the flange 53 is the same as the inside diameter of the ring 34, and the outer peripheral surface of the flange has an upper cylindrical portion 54 and a lower conical portion or chamfer 55 corresponding to the outer surface of the ring and of the same proportions as in the latter. The inner edge of the flange 53 is also chamfered at 52 to facilitate leading the flange into the groove 25 in the end of the insert.

When the tool is inserted into the groove 25 and struck a hammer blow, the rim 30 is expanded outwardly, embedding the serrations in the wall of the counterbore. However, instead of remaining in place, the tool 33 is extracted from the insert, leaving the locking head expanded as shown in Figure 6.

In the form of the invention disclosed in Figures 1 to 6, inclusive, the insert is shown to have a central screwthreaded bore 60 which is adapted to receive a screwthreaded bolt, stud, or other anchorage member. These internal threads may be of any desired contour, direction of lead, or pitch to meet the needs of any particular installation, and they may be either straight or tapered. Furthermore, the insert may be made up in a wide range of sizes, being equally adaptable to relatively minute fittings, as for instrument purposes, or to relatively large sizes. Inasmuch as the tubular insert body is securely locked against torsional displacement by the locking head 20, and against longitudinal displacement by its screwthreaded engagement with the parent body 10, any such member as a stud or the like screwed into the bore 60 of the insert body will likewise be securely anchored to the body 10 against both torsional and longitudinal displacement.

Figure 7 illustrates another form of the invention in which the insert body, designated generally by the reference numeral 65, is solid rather than tubular, and is provided with an integral, externally projecting stud 66 having screwthreads 67 formed thereon. The insert is shown as screwed into the bore 12, but before the locking head has been expanded. A locking ring 34 is shown in position for insertion into the groove 25 of the locking head 20, and the installing tool 68 used to drive the ring into its groove may typically be tubular in form so as to pass down over the stud 68. If it is desired to expand the outer rim of the locking head 20 without using a ring 34, an installing tool similar to that in Figure 5 but modified to provide a guide bore to receive the stud 66, instead of the pilot 47, may be used. The invention in this form securely anchors the head end of a stud to the parent body, and connections of any kind desired may be made to said stud.

Another form of the invention is illustrated in Figures 8 and 9, and in this instance the locking head, designated 20a, is solid and not provided with an annular groove as in the preceding construction. Instead, the bore of the insert is counterbored at 70 to the depth of the locking head and to a diameter equal to or slightly greater than the diameter of the bore 60a measured to the root of the threads. The entire locking head is expanded radially outward by a tool such as the one indicated by the reference numeral 71 in Figure 9. The tool 71 is in the nature of a hardened steel bolt having a threaded stud 72 which is adapted to be received within the threaded bore 60a of the insert, a smooth shank portion 73 of somewhat larger diameter than the diameter of the counterbore 70, and a hexagonal wrench head 74. The bottom end of the shank portion 73 is smoothly rounded off at 75 to guide the shank into the counterbore and then spread the locking head 20a by a gradual camming action as the tool is turned down into the insert by a wrench.

Preferably, the outside diameter of the locking head 20a, measured from crest to crest of the serrations, is the same as or slightly greater than the outside diameter of the threads 16a, and the diameter of the counterbore is, of course, only a few thousandths of an inch larger than the outside diameter of the locking head. The depth of the counterbore 13a is substantially the same as the depth of the locking head so that the latter seats on the bottom of the counterbore when the insert is screwed into the threaded bore 12a, and is supported by the counterbore while expansion of the locking head is taking place. The diameter of the counterbore 70 in the insert is such that when the locking head is expanded, its dimension is the same as the outside diameter of the connecting bolt which is to be used in the insert. In this way, the connecting bolt backs up the locking head 20a and prevents the latter from yielding or collapsing under high torque loads on the insert.

Figures 10 and 11 show still another form of the invention. In this embodiment, the tubular body of the insert is provided on its outer surface with a plurality of longitudinally extending serrations or splines 80 which are adapted to broach their way into the side walls of a smooth bore 81 in the parent body to lock the insert against turning. The serrations 80 are generally triangular in shape, as seen in plan form, and their crests are preferably slightly rounded to eliminate stress concentrations. The diameter of the bore 81 is made just slightly larger than the outside diameter of the insert taken across the roots of the serrations so that the serrations project outwardly beyond the peripheral defining surface of the bore. The bottom ends of the serrations 80 may be undercut at a slight cutting angle or rake, as indicated at 82, so as to form said serrations as broaching tools, and the undercut ends of the serrations 80 are radiused into a pilot stud 83 which is adapted to enter the bore 81 ahead of the serrations to guide the insert in.

The locking head of the insert is designated at 20b and comprises a radial flange similar in dimensions to the flange 20 of the embodiment illustrated in Figures 1 to 6. An annular groove 25b may be provided in the end of the locking head to receive a ring 34b or the expanding flange of an installing tool such as that shown in Figure 5, or the locking head may be made solid, as in Figure 8, and adapted to be expanded by a tool such as 71 in Figure 9. Formed on the outer peripheral surface of the locking head 20b is a plurality of circumferentially extending serrations 85 which may be either in the form of separate annular ridges or a continuous spiral thread. The locking head 20b is expanded radially outward by driving the ring 34b into the groove 25b, or by using a suitable tool, which causes the serrations 85 to be embedded in the side walls of the counterbore 13b, thereby locking the insert against longitudinal displacement with respect to the parent body.

In all of the embodiments described above, the locking formations on the locking head of the insert have been described as angular serrations or splines. It is to be understood, however, that this is not the only configuration which might be used, but that any other shape or form of projection which, when embedded in the side walls of the counterbore in the parent body, will lock the insert against turning (or against longitudinal displacement in the case of the embodiment shown in Figures 10 and 11) might be used with equal success. For example, instead of serrations, the locking formations might be in the form of a crossed knurl, or a thread of opposite lead to the threads on the outside of the insert might be used. Still another form of locking formations might comprise a combination of horizontal and vertical grooves cut into the sides of the locking head, and there are other forms which will occur to those skilled in the art.

One of the advantageous features of the invention in all of its embodiments is the simplicity and ease with which the inserts may be removed and replaced in the event of damage to the insert threads. In the case of the tubular inserts, the insert is removed by drilling out the center portion of the locking head to such a diameter and depth as to sever the head from the body of the insert, as shown and described in my United States Patent No. 2,407,904, granted September 17, 1946, and my pending application, Serial No. 601,454, filed June 25, 1945. After this drilling operation, the severed locking head may be pried out, and the tubular bore then removed by an "easy-out" or equivalent extracting tool. When the insert has been completely removed, it may be replaced by a substitute insert of the same kind or by a two piece insert of the type shown and described in my United States Patent No. 2,400,318, granted May 14, 1946.

If the insert to be removed is of the stud type shown in Figure 7, the locking head may be severed from the body of the insert by a hollow end mill which cuts a circular groove through the locking head concentric with the stud. In this case, the insert may then be removed by applying a pipe wrench directly to the stud or, if the stud is broken off flush with or close to the end of the locking head, it may be necessary to drill a hole in the solid body of the insert and then use any well known extraction tool for backing the stud out of the parent body.

It will further be evident that the present insert may be employed as a replacement for a damaged and removed one-piece molded-in insert disclosed in my aforesaid Patent No. 2,407,904 and my aforesaid pending application Serial No. 601,454.

While I have shown and described above in considerable detail certain selected embodiments of my invention, it is to be understood that these embodiments are merely illustrative, and that various changes in design, structure and arrangement may be made without departing from the spirit and scope of the invention expressed in the appended claims.

I claim:

1. An insert adapted for use with a body having a bore extending inwardly from the surface thereof and an enlarged counterbore, said insert comprising a cylindrical body having a plurality of longitudinally extending broaching serrations on the lower end thereof adapted to broach their way into the side walls of said bore when said insert is installed so as to lock the insert against turning, and a locking head at the upper end of said body having a plurality of locking formations on the outer peripheral surface thereof, said locking head having an annular groove sunk therein from its outer end face for a major proportion of the length of said head, said groove being adapted to receive expander means to radially expand the peripheral rim portion of said head and thereby embed said formations in said counterbore to lock the insert against longitudinal displacement.

2. An insert adapted for use with a body having a bore extending inwardly from the surface thereof and an enlarged counterbore, said insert comprising a cylindrical body having a plurality of longitudinally extending broaching serrations on the lower end thereof adapted to broach their way into the side walls of said bore when the insert is installed so as to lock the insert against turning, and a locking head at the upper end of said body having a plurality of circumferentially extending serrations on its outer peripheral surface, said locking head having an annular groove sunk therein from its outer end face for a major proportion of the length of said head to receive expanding means whereby the outer rim portion of said head is expanded to embed its serrations in said counterbore to lock the insert against longitudinal displacement.

3. An insert for connection with a body having a screwthreaded and counterbored socket formed therein, comprising: a cylindrical body including a shank having external screwthreads engageable with said screwthreaded socket, and a cylindrical head at one end of said shank receivable with a relatively close fit in said counterbore, said head having a plurality of locking projections on its outer peripheral surface, and having a central longitudinally disposed annular cavity sunk in the end thereof to a depth only slightly less than the height of said head to form a radially expansive peripheral head member integrally joined with said shank by a readily deformable annular connecting section adapted to accommodate such expansion, the peripheral side wall of said cavity being formed substantially parallel with the axis of said body, thereby adapting said cavity to the reception of a wedging member of slightly greater diameter than said cavity to progressively radially expand said head member and so press said projections into the side wall of said counterbore to lock the insert against rotation.

4. An insert for connection with a body having a screwthreaded and counterbored socket formed therein, comprising: a cylindrical body including a shank having external screwthreads engageable with said screw threaded socket, and a cylindrical head at one end of said shank receivable with a relatively close fit in said counterbore, a central longitudinally disposed annular groove sunk in the end thereof to a depth only slightly less than the height of said head, to form said head with a radially expansive peripheral collar member integrally joined with said shank by a readily deformable annular connecting section, a plurality of locking projections on the periphery of said collar member, and a longitudinal axial screw-threaded bore in said head and shank, of a diameter less than the inside diameter of said annular groove, the outer side wall of said groove being formed substantially parallel with the axis of said body, thereby adapting said groove to the reception of a wedging ring of slightly greater outside diameter than said annular groove to radially expand said collar member and so press said projections into the side wall of said counterbore to lock the insert against rotation.

5. An insert for connection with a body having a screwthreaded and counterbored socket formed therein, comprising, in combination: a cylindrical body including a shank having external screwthreads adapted for engagement with said screwthreaded socket, and having a cylindrical head at one end of said shank receivable with a relatively close fit in said counterbore, said head being provided with a plurality of locking projections on its peripheral surface, and having a centrally disposed annular groove sunk in the outer end thereof, said groove extending longitudinally into said head for a major portion of the length thereof, and having a substantially cylindrical outer side wall, and a wedge ring within said groove operable, when forced down therein, to progressively expand the portion of said head outside of said groove and embed said locking formations in the side walls of said counterbore to lock the insert against turning.

6. An insert for connection with a body having a screwthreaded and counterbored socket formed therein, comprising, in combination: a cylindrical body including a shank having external screwthreads adapted for engagement with said screwthreaded socket, and having a cylindrical head at one end of said shank receivable with a relatively close fit in said counterbore, said head being provided with a plurality of locking projections on its peripheral surface, and having a centrally disposed annular groove sunk in the outer end thereof, said groove extending longitudinally into said head for a major portion of the length thereof, and having a substantially cylindrical outer side wall, and an expander member including an annular wedging portion operable within said groove to progressively expand the outer peripheral portion of said head outside of said groove and embed said locking formations in the side walls of said counterbore to lock said insert against turning.

7. An insert for connection with a body having a screwthreaded and counterbored socket formed therein, comprising, in combination: a cylindrical body including a shank having external screwthreads adapted for engagement with said screwthreaded socket, and having a cylindrical head at one end of said shank receivable with a relatively close fit in said counterbore, said head being provided with a plurality of locking projections on its peripheral surface, and having a centrally disposed annular groove sunk in the outer end thereof, said groove extending longitudinally into said head for a major portion of the length thereof, and having a substantially cylindrical outer side wall, and an expander member including an annular portion operable within said groove, said annular portion being formed with a straight cylindrical inner peripheral surface and a tapering conical outer peripheral surface, whereby the outer periphery of said head is wedged outwardly to embed said projections in the side walls of said counterbore to lock said insert against turning.

8. An insert for connection with a body having a screwthreaded and counterbored socket formed therein, comprising, in combination: a cylindrical body including a shank having external screwthreads adapted for engagement with said screwthreaded socket, and having a cylindrical head at one end of said shank receivable with a relatively close fit in said counterbore, said head being provided with a plurality of locking projections on its peripheral surface, and having a centrally disposed annular groove sunk in the outer end thereof, said groove extending longitudinally into said head for a major portion of the length thereof, and having substantially parallel side walls, and an expander member including an annular portion operable within said groove, said annular portion being formed with a straight cylindrical inner peripheral surface and an outer peripheral surface comprising a straight cylindrical portion and a tapered conical portion, said tapered conical portion exerting a wedging action within said groove when the expander member is forced down therein causing the outer periphery of said head to be expanded outwardly to embed said projections in the side walls of said counterbore and thereby lock said insert against turning.

9. An insert for connection with a body having a screw-threaded and counterbored socket formed therein, comprising, in combination: a cylindrical body including a shank having external screwthreads adapted for engagement with said screwthreaded socket, and having a cylindrical head at one end of said shank receivable with a relatively close fit in said counterbore, said head being provided with a plurality of locking projections on its peripheral surface, and having a centrally disposed annular groove sunk in the outer end thereof, said groove extending longitudinally into said head for a major portion of the length thereof, and having substantially parallel side walls, and an expander member including an annulus operable within said groove, said annulus being formed with a straight cylindrical inner peripheral surface and an outer peripheral surface comprising a straight cylindrical portion for substantially two-thirds of its length and a tapered conical portion for substantially one-third of its length, said tapered conical portion exerting a wedging action within said groove when forced down therein causing the outer periphery of said head to be expanded outwardly to embed said projections in the side walls of said counterbore and thereby lock said insert against turning.

10. An insert adapted for use with a body having a bore extending inwardly from the surface thereof and an enlarged counterbore, said insert comprising a cylindrical body having a plurality of longitudinally extending broaching serrations on the lower end thereof adapted to broach their way into the side walls of said bore when the insert is installed so as to lock the insert against turning, and a locking head at the upper end of said body having a plurality of circumferentially extending serrations on its outer peripheral surface, said locking head having an annular groove sunk therein from its outer end face for a major proportion of the length of said head, and a wedge shaped expander ring in said groove to expand the outer rim portion of said head and thereby embed its serrations in said counterbore to lock the insert against longitudinal displacement.

11. An insert for connection with a body having a bore and counterbore sunk therein, comprising, in combination: a cylindrical body including a shank receivable in said bore and a head receivable in said counterbore, locking formations on said shank and head for locking said insert in said bore and counterbore against both rotation and longitudinal displacement, said head having a centrally disposed annular cavity sunk in the outer end thereof for a substantial proportion of the length of said head, said cavity having a substantially cylindrical outer side wall, and a wedge annulus in said annular cavity operable when forced down therein to progressively expand said head and thereby drive the locking projections therein radially outward and into the walls of said counterbore.

12. An insert for connection with a body having a bore and counterbore sunk therein, comprising, in combination: a cylindrical body including a shank receivable in said bore and a head receivable in said counterbore, locking formations on said shank and head for locking said insert in said bore and counterbore against both rotation and longitudinal displacement, said head having a centrally disposed annular groove sunk in the outer end thereof for a substantial proportion of the length of said head, said groove having a substantially cylindrical outer side wall, and a wedge annulus in said annular groove operable when forced down therein to progressively expand said head and thereby drive the locking projections therein radially outward and into the walls of said counterbore.

JOSEPH ROSAN.

REFERENCES CITED

The following references are of record in the file of this patent:

UNITED STATES PATENTS

| Number | Name | Date |
|---|---|---|
| 1,204,181 | Norton | Nov. 7, 1916 |
| 1,281,174 | Kraft | Oct. 8, 1918 |

(Other references on following page)

UNITED STATES PATENTS

| Number | Name | Date |
|---|---|---|
| 1,368,896 | Chambley | Feb. 15, 1921 |
| 1,373,645 | Bandoly | Apr. 5, 1921 |
| 1,616,996 | Talaga | Feb. 8, 1927 |
| 1,648,347 | Hosking | Nov. 8, 1927 |
| 1,875,930 | Martin | Sept. 6, 1932 |
| 1,895,845 | D'Halloy | Jan. 31, 1933 |
| 1,896,388 | Zeidler | Feb. 7, 1933 |
| 1,919,455 | Wilson | July 25, 1933 |
| 1,966,044 | Place | July 10, 1934 |
| 1,988,310 | Garrett | Jan. 15, 1935 |
| 2,122,839 | Guy | July 5, 1938 |
| 2,203,219 | Jackman | June 4, 1940 |
| 2,226,491 | Gustafson | Dec. 24, 1940 |
| 2,292,467 | Norsell | Aug. 11, 1942 |
| 2,321,466 | Crowther | June 8, 1943 |
| 2,354,314 | Harsted | July 25, 1944 |
| 2,392,133 | Eklund | Jan. 1, 1946 |
| 2,395,063 | Paulus | Feb. 19, 1946 |
| 2,400,318 | Rosan | May 14, 1946 |
| 2,455,885 | Theurer | Dec. 7, 1948 |

FOREIGN PATENTS

| Number | Country | Date |
|---|---|---|
| 464,298 | Great Britain | Apr. 15, 1937 |